Dec. 29, 1964 P. F. LYNN 3,163,186
FILAMENT FORMING APPARATUS
Filed Feb. 13, 1961 14 Sheets-Sheet 1

INVENTOR.
PHILIP F. LYNN
BY Joseph C. Ryan
ATTORNEY

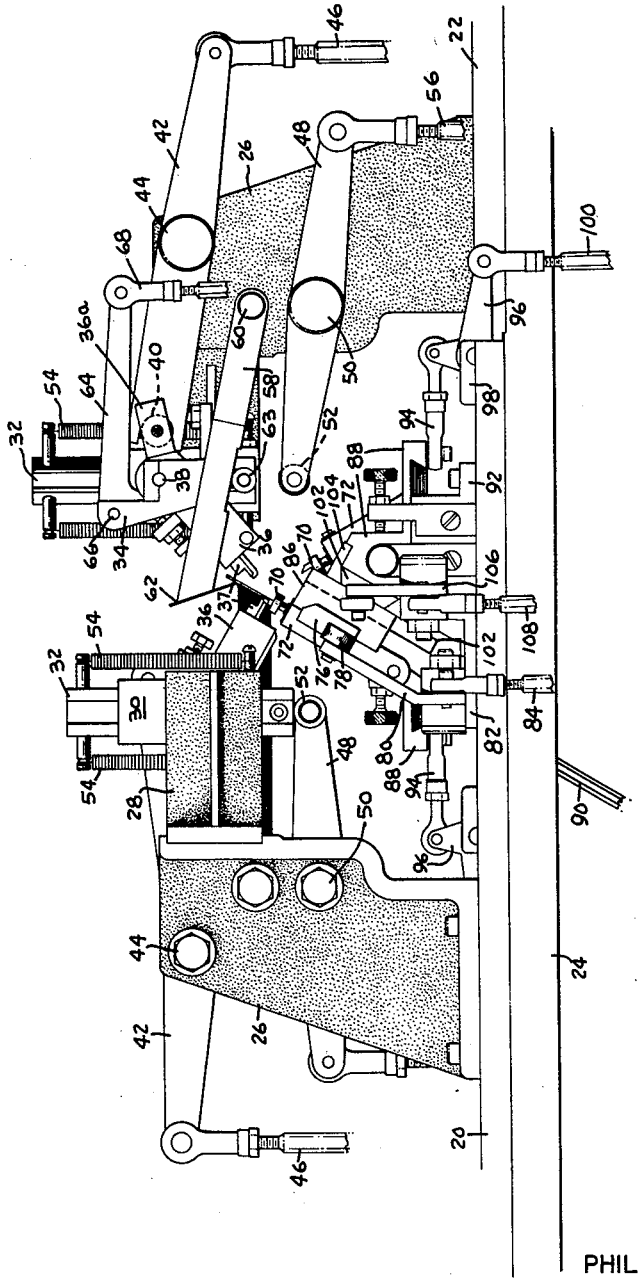

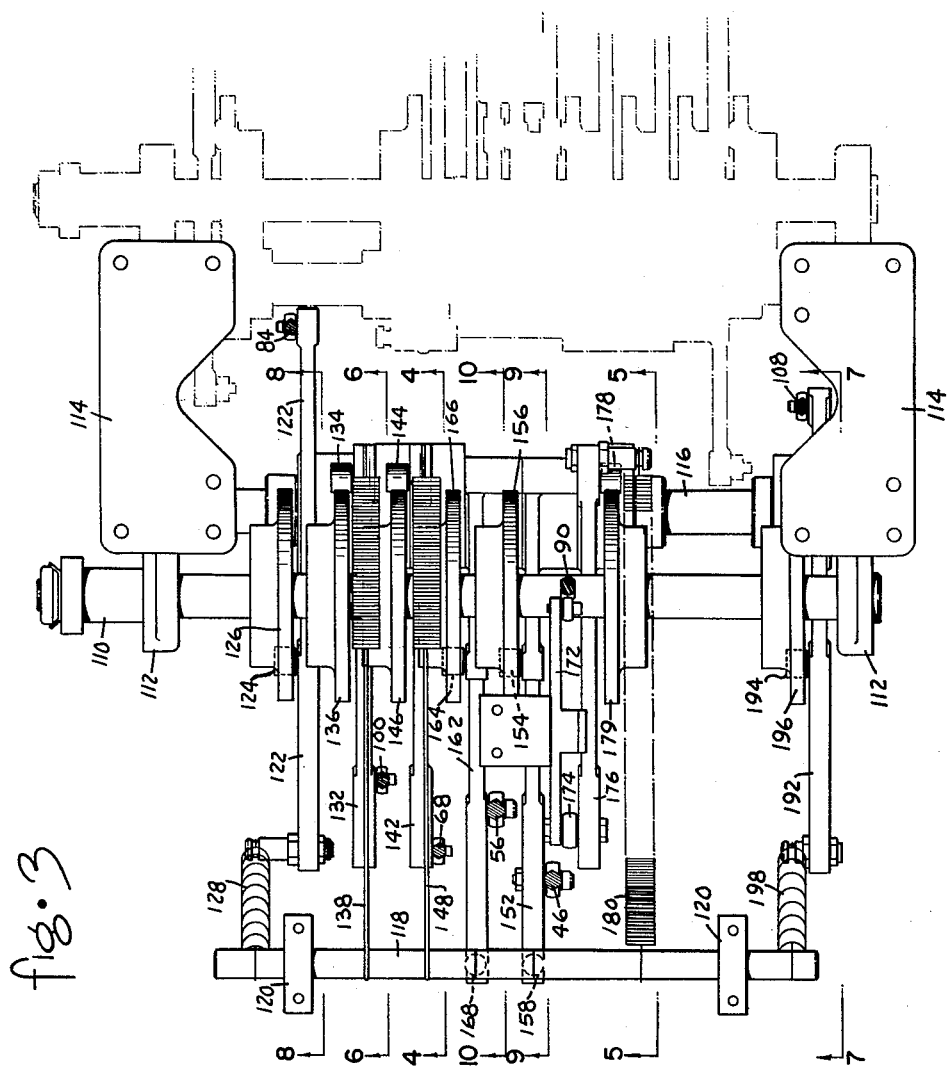

Dec. 29, 1964     P. F. LYNN     3,163,186
FILAMENT FORMING APPARATUS
Filed Feb. 13, 1961     14 Sheets-Sheet 4
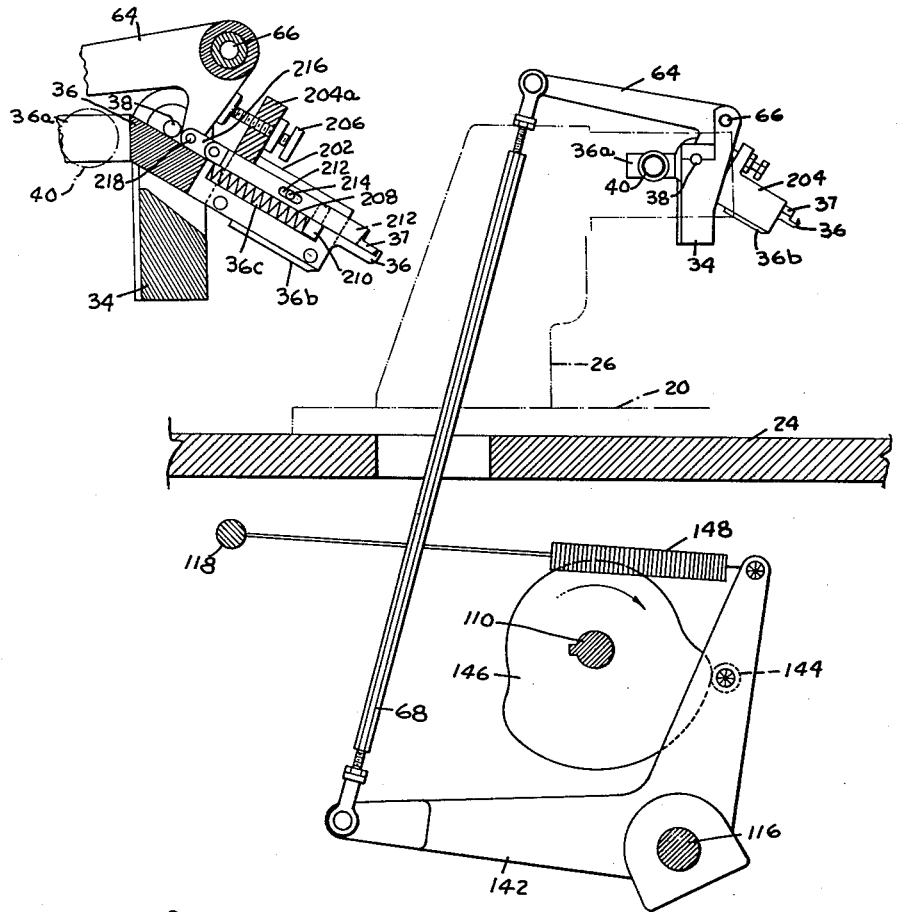
PHILIP F. LYNN
*INVENTOR.*
BY Joseph C. Ryan
ATTORNEY

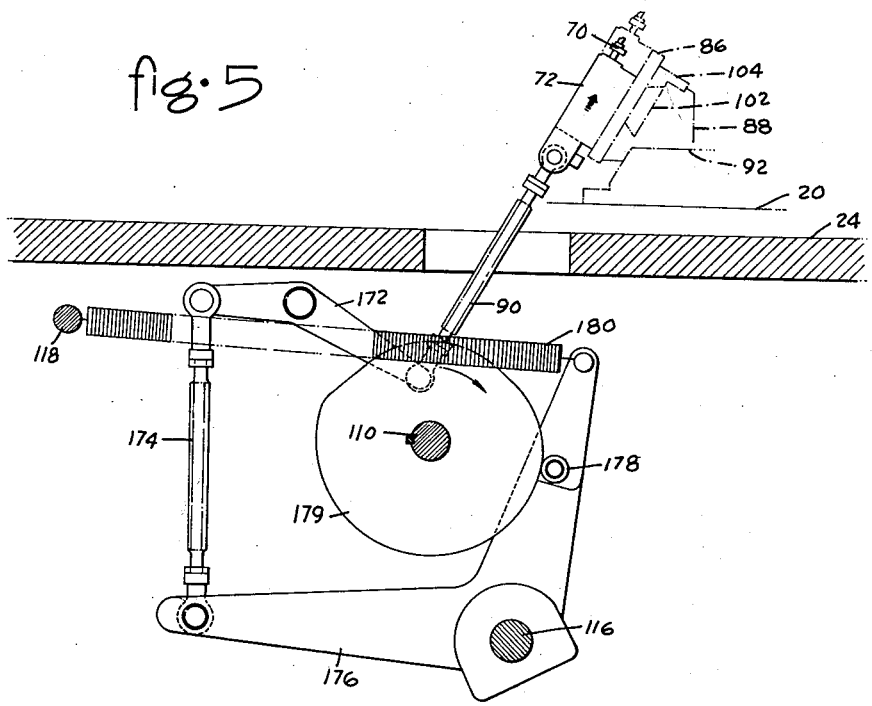

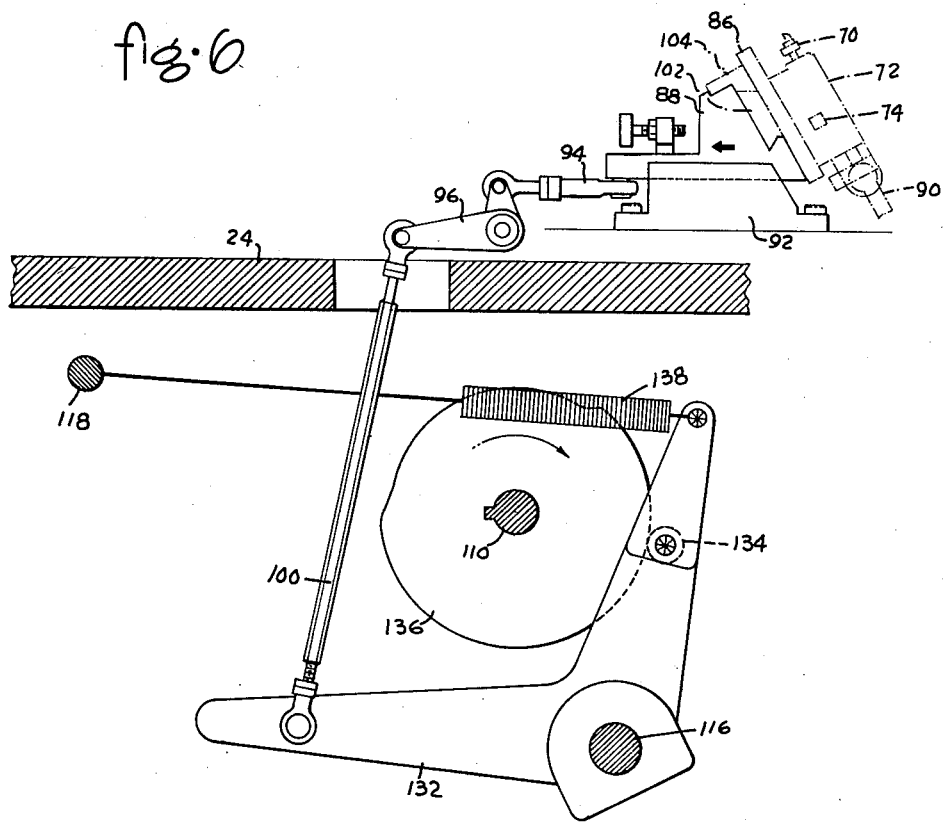

Dec. 29, 1964 P. F. LYNN 3,163,186
FILAMENT FORMING APPARATUS
Filed Feb. 13, 1961 14 Sheets-Sheet 7
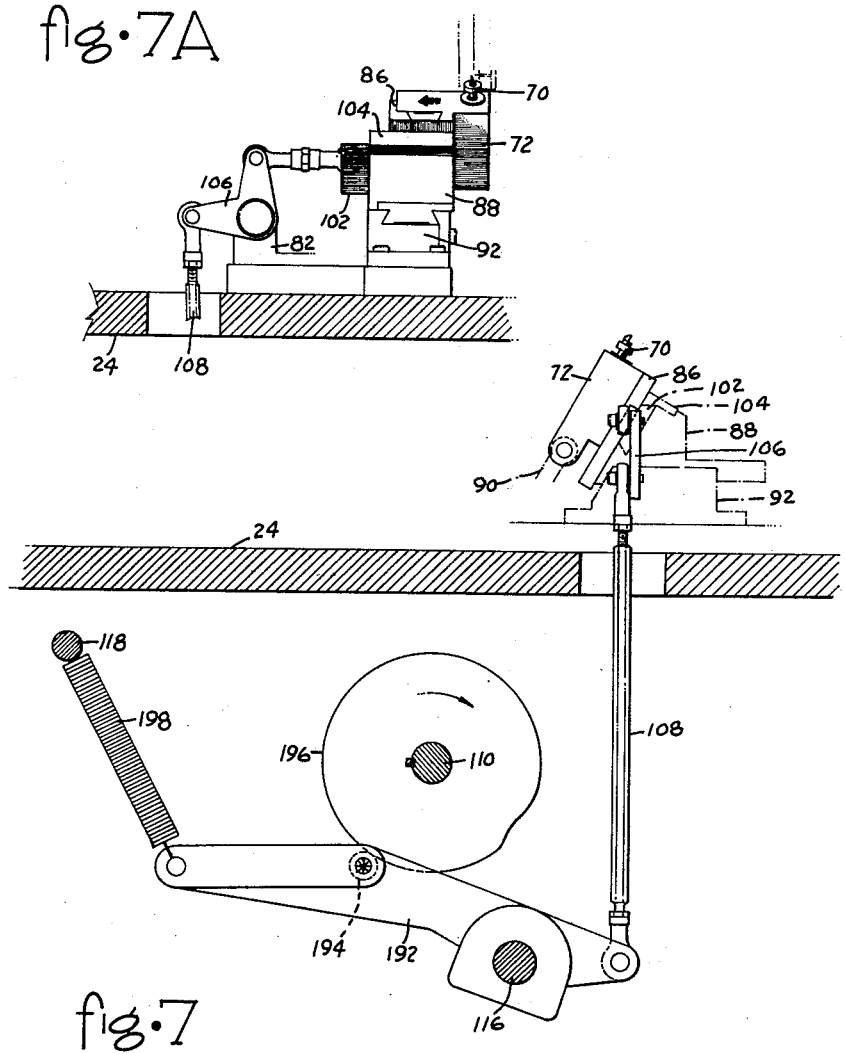
PHILIP F. LYNN
*INVENTOR.*
BY Joseph C. Ryan
ATTORNEY

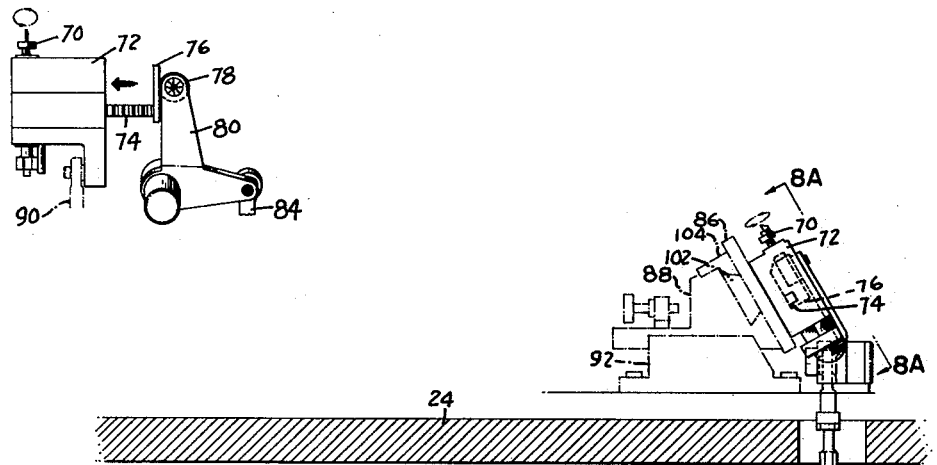
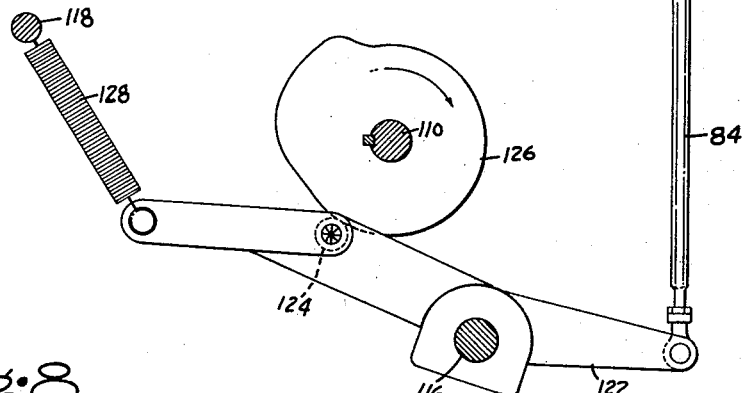

Dec. 29, 1964  P. F. LYNN  3,163,186
FILAMENT FORMING APPARATUS
Filed Feb. 13, 1961  14 Sheets-Sheet 9

PHILIP F. LYNN
*INVENTOR.*

BY Joseph C. Ryan
ATTORNEY

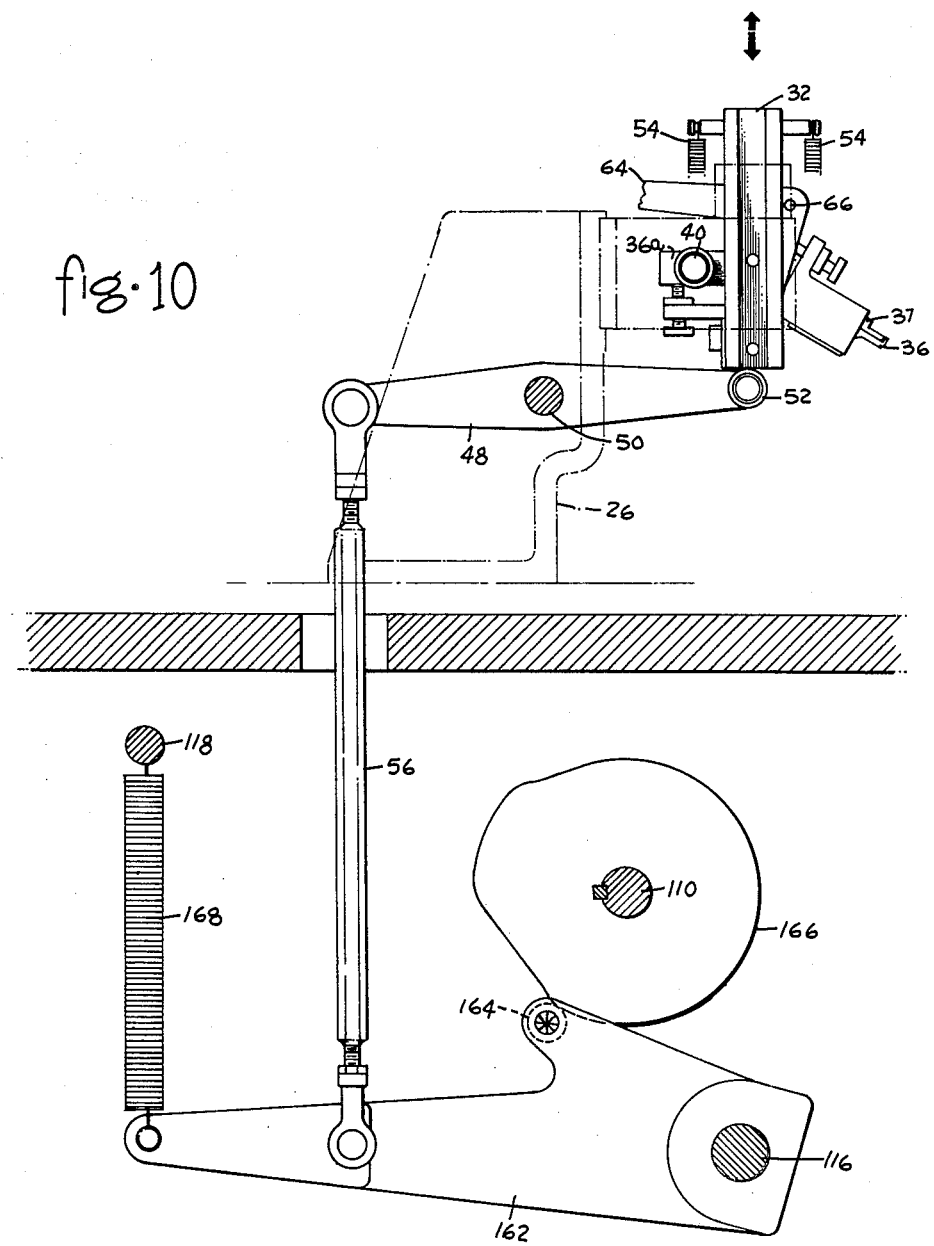

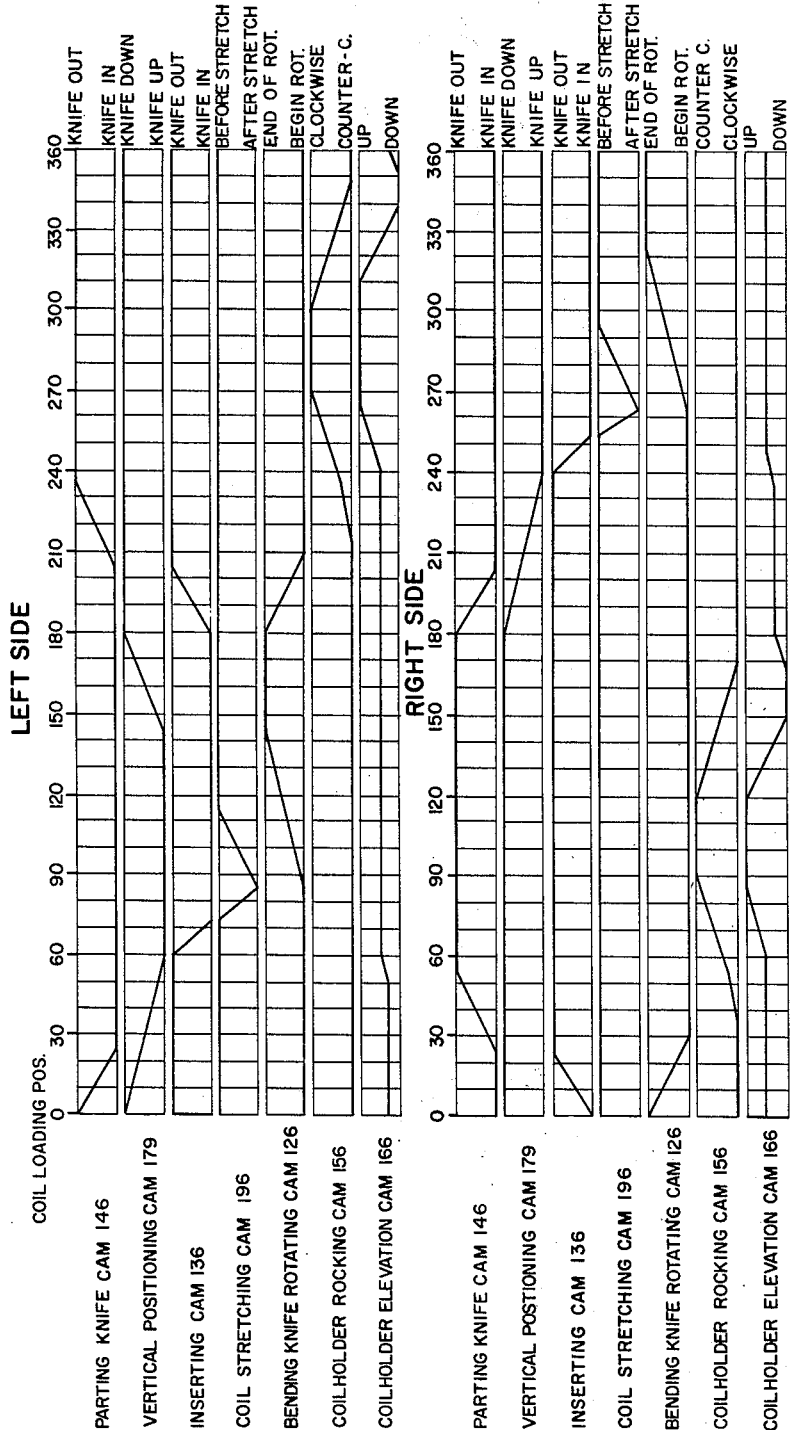

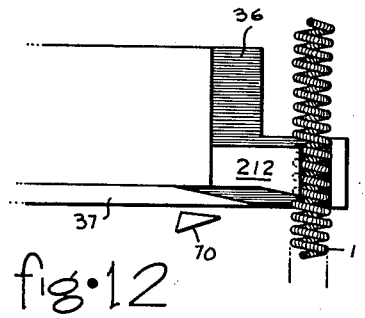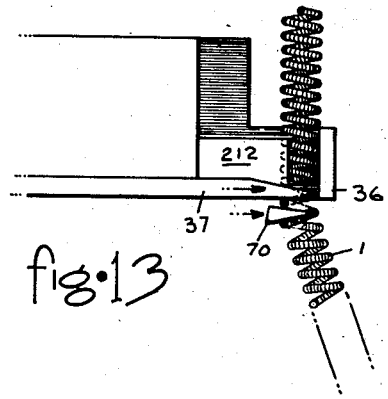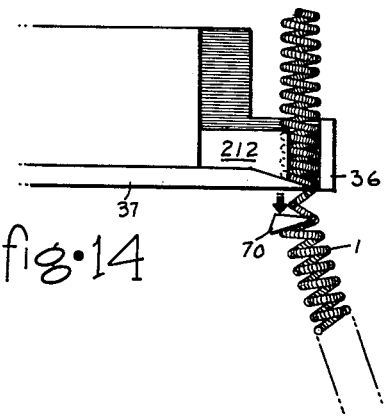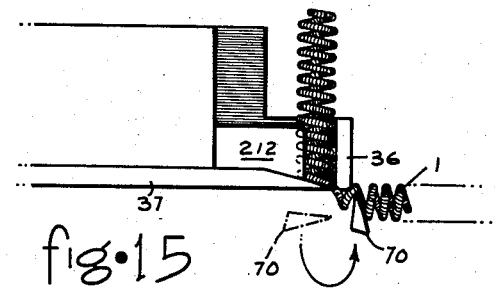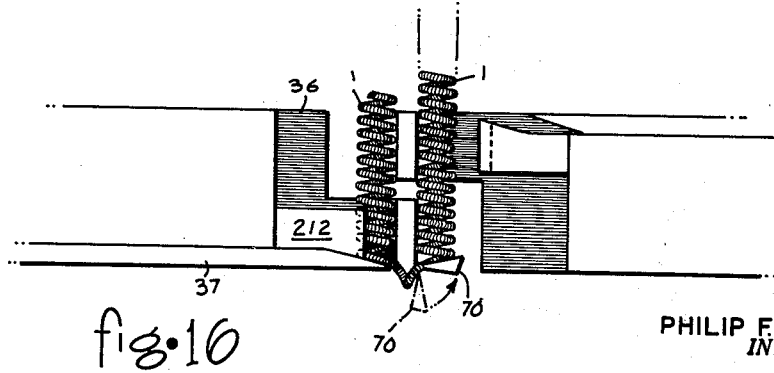

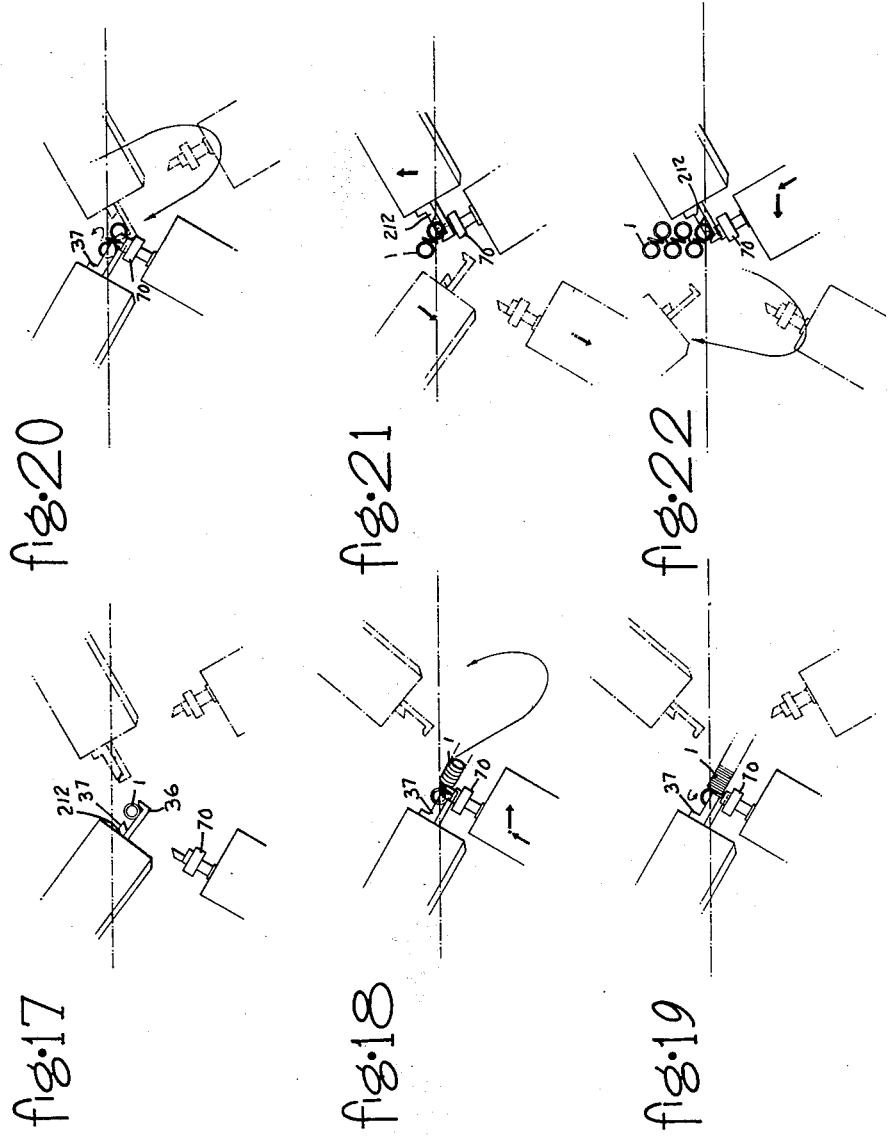

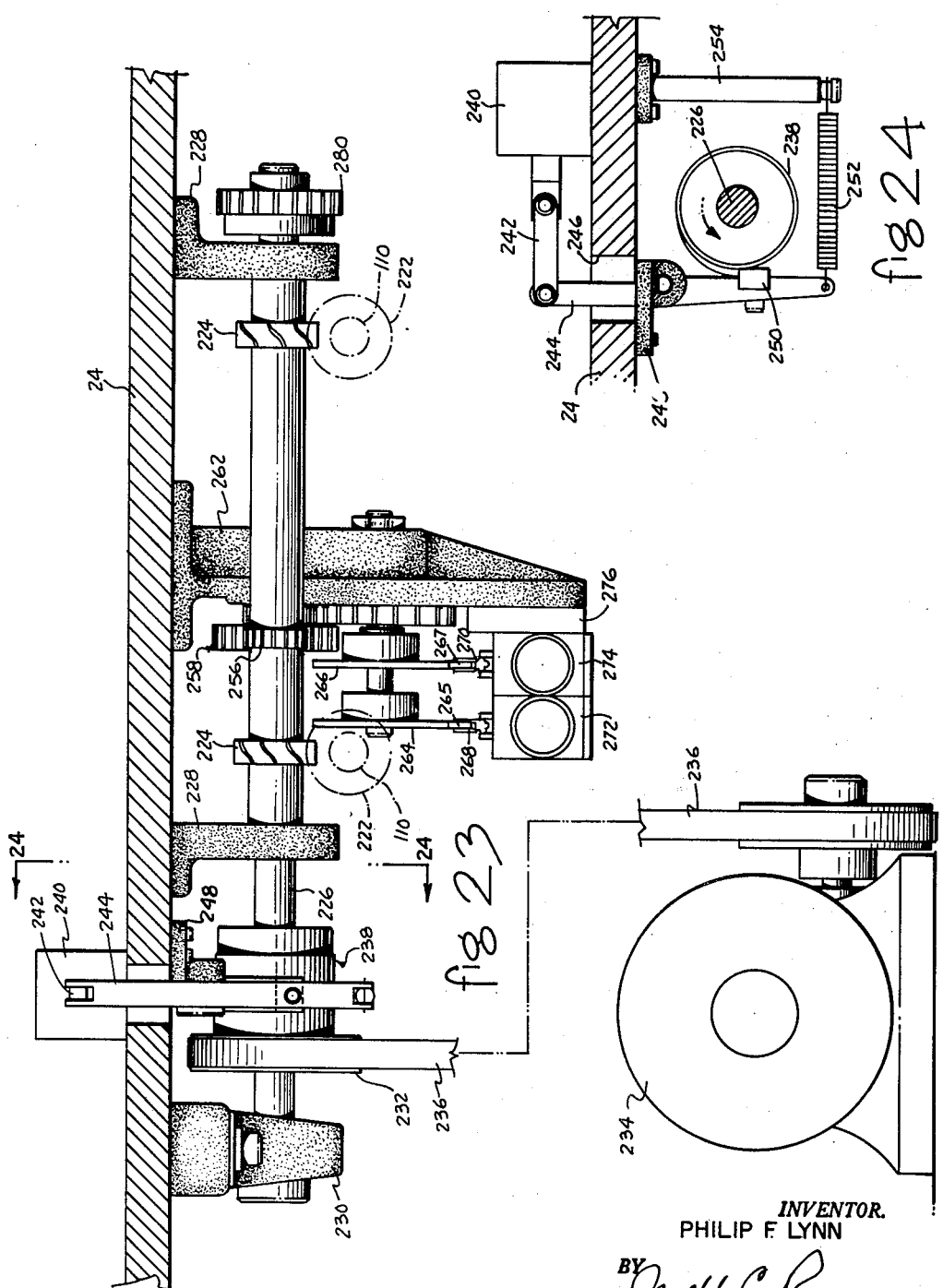

United States Patent Office 3,163,186
Patented Dec. 29, 1964

3,163,186
FILAMENT FORMING APPARATUS
Philip F. Lynn, Lynnfield, Mass., assignor to Sylvania Electric Products Inc., a corporation of Delaware
Filed Feb. 13, 1961, Ser. No. 89,031
13 Claims. (Cl. 140—71.5)

This invention relates to the manufacture of electric lamp filaments, and more particularly to the manufacture of multi-segment filaments of the type employed in high-wattage lamps such as projection lamps for example.

In the manufacture of filaments for projection lamps, especially filaments of the biplane type, considerable care must be exercised to insure uniform length of the individual segments of the filament, uniform spacing between each segment and uniform spacing between the planes of the segments. Since a projection lamp filament of high quality requires very close tolerances, considerable care must be taken during the fabricating process to insure the attainment of these tolerances.

Over the years, various techniques have been developed to provide biplane filaments for high-wattage lamps, such as projection lamps. For example, as shown in U.S. Patent 1,726,480 which issued on August 27, 1929 to A. Fehse, a coiled straight filament of considerable length is made on a suitable coiling machine. This filament when so formed comprises a plurality of coiled segments spaced from and connected to one another by single coil sections which, in subsequent operations, define the upper and lower loops for supporting the filament in the mount structure. This filament so formed on a suitable coiling machine is then wrapped around a suitable core or mandrel, the single coil sections are manually manipulated to define upper and lower loops, to effect alignment thereof, and fired to effect a setting thereof.

Another technique is illustrated and described in U.S. Patent 2,655,952 which issued on October 20, 1953 to O. Mann et al. In accordance with the teachings of that patent, a coil filament is shaped on a mandrel to provide and define a biplane filament comprising a plurality of coil segments connected to one another by upper and lower loops. This mandrel is part of a bench jig and the fabrication of a biplane filament thereon requires the use by an operator of a pair of forming tools.

The deficiencies of the techniques and devices employed heretofore, of which the foregoing are but two illustrations, have long been recognized in the art. It is quite apparent, for example, that manual handling and/or manual manipulation with tools is not conducive to either high speed production or uniformity of product structure.

In view of the foregoing, one of the principal objects of this invention is the high speed, automatic manufacture of multi-segment filaments have a high degree of product structure uniformity. In accordance with the principles of this invention, a high speed automatic machine is provided whereby multi-segment filaments having a high degree of product structure uniformity are obtained.

In the specific embodiment of the invention illustrated in the accompanying drawings and described below, a pair of cooperating coil former assemblies are provided to fold a single filament coil into a series of connected segments to thereby define a biplane filament. Each of these coil former assemblies comprises a coil holder assembly and a bending knife assembly. Each of the coil holder assemblies includes means for supporting and gripping a coil and a parting knife associated therewith, along with their actuating means. Each of the bending knife assemblies includes a bending knife and several actuating means associated therewith for manipulating the bending knife during each operating cycle to form, in cooperation with the parting knife associated with the coil holder assembly, a coil segment and a connecting loop. When one of these coil former assemblies is working on a coil to define and shape a coil segment and a connecting loop, the other coil former is located in a rest position displaced from the working area. As the operating cycle of the former nears completion, the latter is actuated to displace it from its rest position and advance the coil holder assembly thereof into coil-receiving position. Thus, as soon as the former has completed its work on the coil in one operating cycle thereof, the latter has moved into position to receive the yet unformed portion of the coil. When this occurs, the second coil former assembly takes over and it starts its work on the coil to form and shape another coil segment and another loop, as the first coil former assembly is displaced out of the working area to a rest position. This sequence of operations continues until the desired number of coil segments and connecting loops have been formed and shaped to thereby define a biplane filament.

In the specific embodiment of the invention illustrated in the accompanying drawings, FIGURE 1 is a top plan view of a specific embodiment of a biplane filament forming apparatus embodying the principles of this invention.

FIGURE 2 is a front elevational view of the apparatus of FIGURE 1.

FIGURE 3 is a top plan view of the drive mechanisms disposed beneath the main base member on which the apparatus of FIGURES 1 and 2 is supported. The drive mechanisms associated with the left side coil former assemblies are shown in solid and portions of the drive mechanisms associated with the right side coil former assemblies are shown in phantom.

FIGURE 4 is a front elevational view of the coil holder assembly, which includes the parting knife and its drive, shown in the retracted or coil-receiving position.

FIGURE 4A is a fragmentary detail, partly in section, showing details of the coil holder assembly including the spring drive means for advancing the coil clamp arm into gripping engagement with a coil. In this figure, the coil holder assembly is shown in its advanced or coil-gripping position although, for clarity of illustration, the coil itself has not been shown in this particular view.

FIGURE 5 is a front elevational view of the bending knife slide and the drive mechanism associated therewith for moving the bending knife projecting from the bending knife slide into and out of the horizontal plane in which the coil forming operations are performed.

FIGURE 6 is a front elevational view of the drive mechanism for reciprocating the bending knife slide and the bending knife in a substantially horizontal plane to move the bending knife into and out of position between turns of the coil.

FIGURE 7 is a front elevational view of the drive mechanism for actuating the bending knife slide to effect lateral displacement thereof and thus a stretching of the coil by the bending knife.

FIGURE 7A is a side elevational detail of the bending knife slide of FIGURE 7 and those members more immediately associated therewith which cooperate to effect the stretching of the coil by the bending knife.

FIGURE 8 is a front elevational view of the drive mechanism for effecting rotation of the bending knife.

FIGURE 8A is a side elevational detail, looking in the direction 8A—8A of FIGURE 8 showing in greater detail those members more immediately associated with the bending knife for effecting rotation thereof.

FIGURE 10 is a front elevational view of the drive mechanism for reciprocating the coil holder assembly in a vertical plane.

FIGURE 11 is a cam chart showing the timing sequence of operations of the several cams associated with the left side coil former and the right side coil former and their relationships to one another.

FIGURES 12–16 are fragmentary plan details on an enlarged scale showing the relative location of the members most immediately associated with the coil and the coil itself during several stages of one cycle of the left side coil former.

FIGURES 17–22 are fragmentary details in side elevation showing the relative location of the two coil holder assemblies and the two bending knife assemblies during several stages of an operating cycle.

FIGURE 23 is a side elevational view of the drive control mechanism.

FIGURE 24 is a transverse sectional detail, taken along the line 24—24 of FIGURE 23, showing the clutch control mechanism.

*General Organization*

Figure 1:
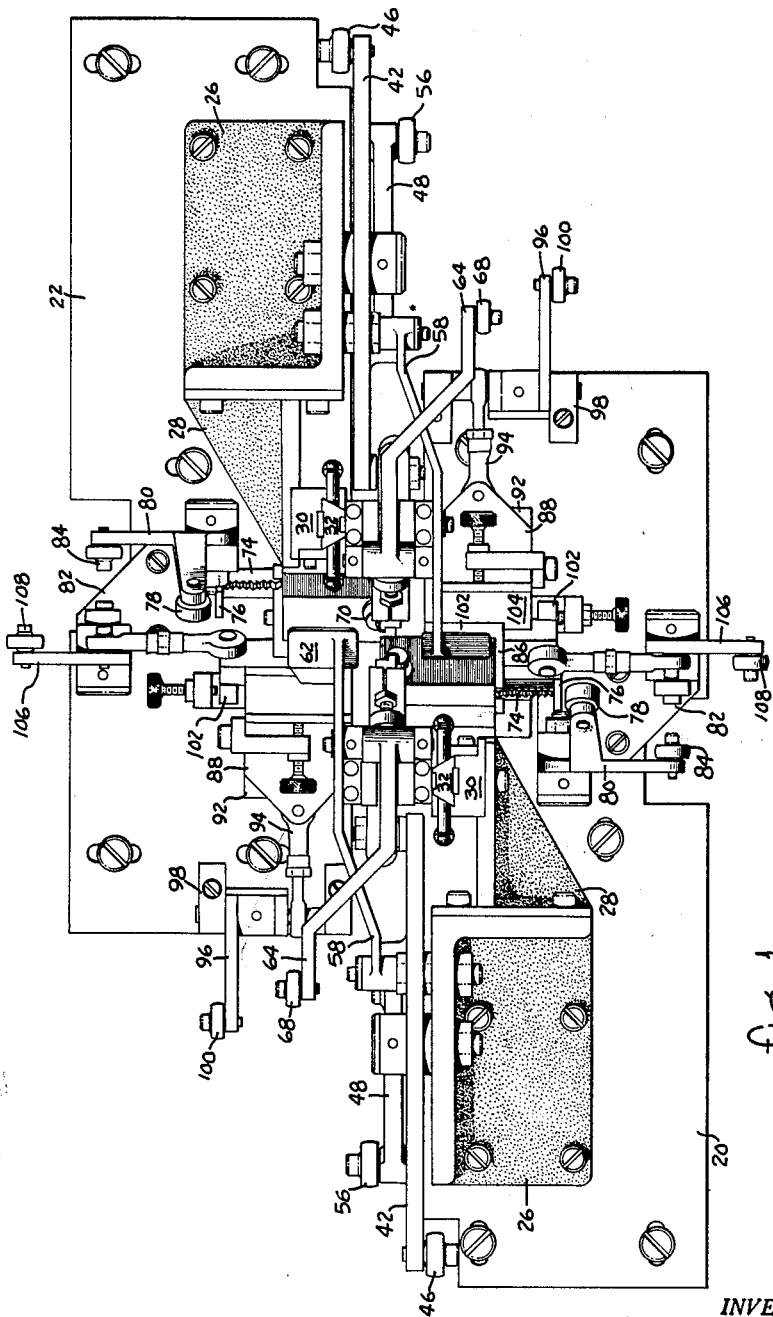

The general organization of a specific embodiment of the apparatus of this invention is illustrated in FIGURES 1, 2 and 3, FIGURE 1 being a top plan view of the apparatus, FIGURE 2 being a front elevational view thereof, and FIGURE 3 being a top plan view of the several drives disposed beneath the table which defines the main base or supporting member for the apparatus of FIGURES 1 and 2.

Referring now to FIGURES 1 and 2, a front mounting plate 20 and a rear mounting plate 22 are adjustably attached to the main base member 24. A pair of brackets 26, one fixedly mounted on the front mounting plate 20 and the other fixedly mounted on the rear mounting plate 22, define the main supporting structure for the front coil holder assembly and rear coil holder assembly respectively. Since these coil holder assemblies are exactly the same, only one of them will be described.

Referring now primarily to FIGURE 2, although some of the structure to be now described may also be seen in FIGURE 1, a slide support bracket 28 is mounted on bracket 26. A stationary slide 30 is mounted on bracket 28 and a movable slide 32 is slidable on stationary slide 30. A bifurcated coil holder support block 34 is fixedly mounted on the movable slide 32. A coil holder 36 is pivotally mounted at one end thereof on a pair of stub shafts 38 in the bifurcated coil holder support block 34. The coil holder 36 is provided with a tail portion 36a which has a roller 40 supported on a side face thereof. This roller 40 rides within the bifurcated end of a coil holder rocking arm 42 which is pivotally supported intermediate its ends at 44 on bracket 26, thus providing the means through which the coil holder may be rocked about its pivot 38. The other end of coil holder rocking arm 42 is connected by coil holder rocking link 46 to its drive mechanism disposed beneath the base member 24, this drive mechanism being shown in FIGURE 3 and described below.

A coil holder elevation arm 48 is pivotally mounted intermediate its ends at 50 in bracket 26. One end of coil holder elevation arm 48 is provided with a roller 52 engageable with the lower end of movable slide 32 to which the coil holder 36 is connected through the coil holder support block 34. The coil holder elevation arm 48 and its associated roller 52 operates cooperatively, as will be described below, with springs 54 supported at one end from the movable slide 32, the other ends of the springs 54 being attached to the stationary slide 30. The other end of coil holder elevation arm 48 is connected through coil holder elevation link 56 to its drive mechanism disposed beneath the base member 24, this drive mechanism being shown in FIGURE 3 and described below.

A coil damping device comprises an arm 58, one end of which is pivotally mounted at 60 in the bracket 26, and an angularly disposed plate 62 attached to the other end of the arm 58. Intermediate its ends, the lower longitudinal edge of arm 58 rides on a roller 63 supported on a side face of movable slide 32. The angularly disposed plate 62 overlies the area where the several forming operations are performed and dampens the whipping action of the coil as it is being manipulated by the working tools. This arrangement tends to increase the control over the coil and decrease the amount of time required to locate the coil as it is swung from one position to another during the coil forming operations.

The coil holder assembly, of which coil holder 36 is a member, includes a parting knife 37. A parting knife operating arm 64 is pivotally mounted near its inner end on its pivot shaft 66 which is supported in coil holder support block 34. The outer end of parting knife operating arm 64 is connected through its link 68 to its drive mechanism disposed beneath the base member 24, this drive mechanism being shown in FIGURE 3 and described below.

The several operations performed on the coil, the article of work, are effected by the aforesaid parting knife 37, associated with the coil holder assembly of which coil holder 36 is a part, and a bending knife 70. The several assemblies associated with the bending knife 70 to impart thereto the several movements thereof which, in cooperation with the coil holder assembly, effect the coil forming operations will now be described.

Still referring to FIGURES 1 and 2, the bending knife 70 is disposed within and projects upwardly from a bending knife slide 72. Disposed within the slide 72 and connected to the inner end of bending knife 70 is a pinion (not shown in these figures) which meshes with a rack 74 which extends outwardly from a side face of the slide 72. The outer end of rack 74 is provided with a contact plate 76 engageable by a roller 78 attached to one end of bellcrank rack operating lever 80. The lever 80 is pivotally mounted intermediate its ends in a bracket 82 mounted on mounting plate 20. The other end of lever 80 is connected to one end of link 84 which is connected to its drive mechanism disposed beneath the base member 24, shown in FIGURE 3 and described below. Rotation of the bending knife is effected by this assembly.

The bending knife slide 72, which has a gib 86 attached to a side face thereof, is slidably disposed for substantially vertical movement on the vertical portion of a coil stretch slide 102. The gib 86 cooperates with a protruding portion of the other side of slide 72 to define a dovetail arrangement for receiving the vertical portion of the coil stretch slide 102. The transverse portion of coil stretch slide 102 is slidable transversely on movable slide block 88. A gib 104 attached to the movable slide block 88 constrains the transverse portion of the coil stretch slide 102 and forms therewith a dovetail arrangement therefor. The movable slide block 88 is slidable horizontally in stationary slide block 92 attached to mounting plate 20.

Substantially vertically movement of bending knife slide 72 on the vertical portion of coil stretch slide 102 is effected through link 90, one end of which is connected to the lower end thereof. The other end of link 90 is connected to its drive mechanism disposed beneath the base member 24, shown in FIGURE 3 and described below. This drive mechanism moves the bending knife 70 up into and down from the horizontal plane in which the coil forming operations are performed.

The movable slide block 88 is connected through link 94 to one end of bellcrank lever 96. The bellcrank lever 96 is pivotally mounted intermediate its ends in bracket 98 mounted on mounting plate 20. Link 100 connects the other end of lever 96 to its drive mechanism disposed beneath the base member 24, shown in FIGURE 3 and described below. Horizontal reciprocation of movable slide block 88 effects movement of bending knife 70 into and out of a position between turns of the coil.

A bellcrank coil stretch arm 106, pivotally mounted intermediate its ends in bracket 82, connects coil stretch slide 102 to link 108. The drive mechanism disposed beneath table 24 and to which link 108 is connected as shown in FIGURE 3 provides the means for actuating the coil stretch slide 102 which in turn effects a stretching of the coil as illustrated in subsequent drawings and described below.

*Drive Mechanisms*

In the foregoing description of FIGURES 1 and 2, the several assemblies through which certain operations were indicated as being performed on the work were described as being connected by links to their respective drive mechanisms disposed beneath the table or main base member 24. These drive mechanisms are illustrated in FIGURE 3 and will now be described. A main drive shaft 110 is supported in arms 112 depending from mounting plates 114 attached to the bottom face of the main base member 24 shown in FIGURES 1 and 2. A rocker arm shaft 116 is similarly supported. A spring supporting rod 118 is supported in a pair of brackets 120 depending from and attached to the bottom face of the main base member 24.

Reading from top to bottom in FIGURE 3, link 84 is connected to one end of rocker arm 122 attached intermediate its ends to rocker arm shaft 116 (see also FIGURES 8 and 8A). A cam follower 124, supported on rocker arm 122 near the other end thereof rides on bending knife rotating cam 126 on main drive shaft 110. The said other end of rocker arm 122 has one end of a spring 128 connected thereto, the other end of the spring 128 being connected to and supported by the spring supporting rod 118. This spring arrangement, and similar spring arrangements associated with the other cams about to be described, insures the firm, positive engagement of the associated cam follower with its cam particularly when it is riding on the low side thereof.

Link 100 is connected to one end of a rocker arm 132 attached intermediate its ends to rocker arm shaft 116 (see also FIG. 6). A cam follower 134, supported on rocker arm 132 near the other end thereof, rides on bending knife inserting cam 136 on main drive shaft 110. The said other end of rocker arm 132 has one end of a spring 138 connected thereto, the other end of the spring 138 being connected to and supported by the spring supporting rod 118.

Link 68 is connected to one end of a rocker arm 142 attached intermediate its ends to rocker arm shaft 116 (see also FIGS. 4 and 4A). A cam follower 144, supported on rocker arm 142 near the other end thereof, rides on parting knife cam 146 on main drive shaft 110. The said other end of rocker arm 142 has one end of a spring 148 connected thereto, the other end of the spring 148 being connected to and supported by the spring supporting rod 118.

Link 56 is connected to a rocker arm 162 near one end thereof, the rocker arm 162 being attached intermediate its ends to rocker arm shaft 116 (see also FIG. 10). A cam follower 164 supported on rocker arm 162 at the other end thereof, rides on coil holder elevation cam 166 on main drive shaft 110. A spring 168 depends substantially in a vertical plane from the spring supporting rod 118 and is connected to the end of rocker arm 162 near the point thereon at which the link 56 is connected thereto.

Figure 9:
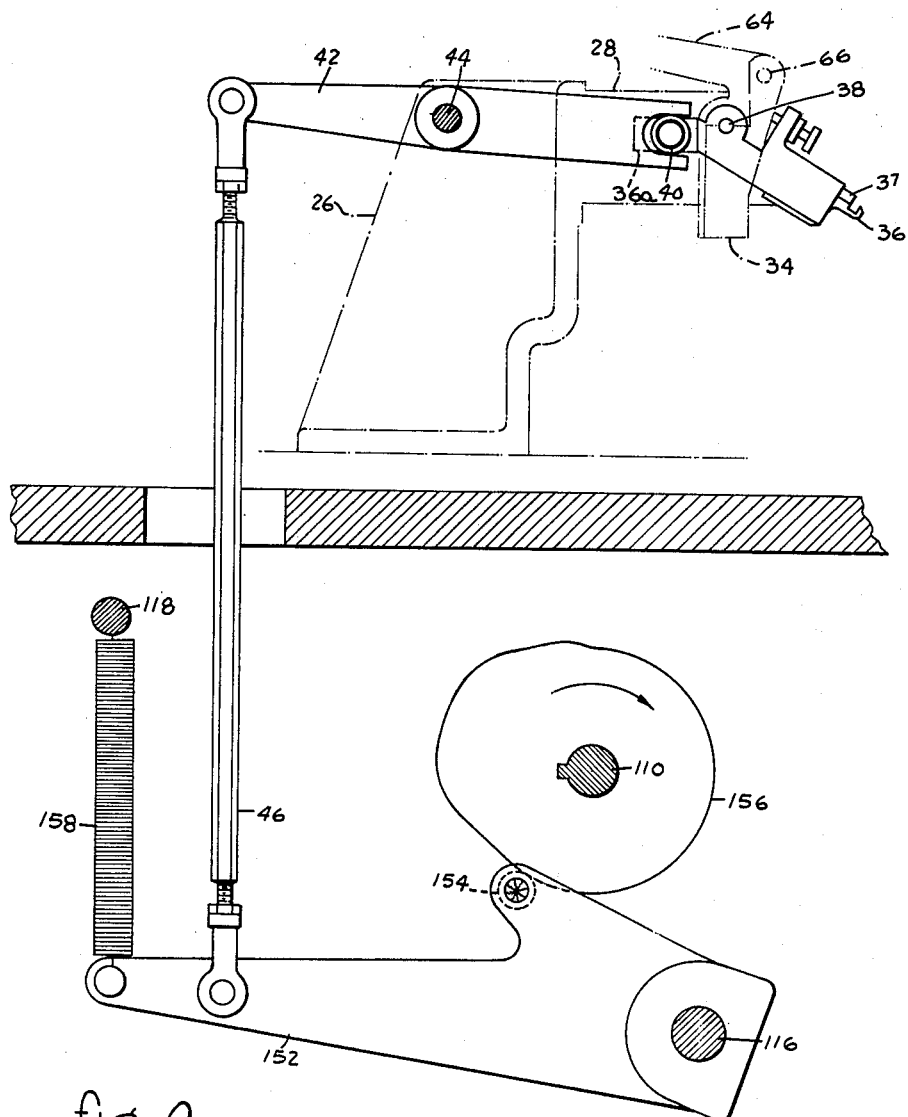
FIGURE 9 is a front elevational view of the drive mechanism for rocking the coil holder assembly to effect clockwise and counter-clockwise rotation thereof about its mounting pivot.

Link 46 is connected to a rocker arm 152 near one end thereof, the rocker arm 152 being attached intermediate its ends to rocker arm shaft 116 (see also FIG. 9). A cam follower 154, supported on rocker arm 152 at the other end thereof, rides on coil holder rocking cam 156 on main drive shaft 110. A spring 158 depends substantially in a vertical plane from the spring supporting rod 118 and is connected to the end of rocker arm 152 near the point thereon at which the link 46 is connected thereto.

Link 90 is connected to one end on an intermediate rocker arm 172 (see also FIG. 5). One end of an intermediate link 174 is connected to the other end of intermediate rocker arm 172. The other end of intermediate link 174 is connected to one end of a rocker arm 176 which is attached intermediate its ends to rocker arm shaft 116. A cam follower 178, supported on rocker arm 176 near the other end thereof, rides on bending knife vertical positioning cam 179 on main drive shaft 110. The said other end of rocker arm 176 has one end of a spring 180 connected thereto, the other end of the spring 180 being connected to and supported by the spring supporting rod 118.

Link 108 is connected to one end of a rocker arm 192 attached intermediate its ends to rocker arm shaft 116 (see also FIGS. 7 and 7A). A cam follower 194, supported on rocker arm 192 near the other end thereof, rides on coil stretching cam 196 on main drive shaft 110. The said other end of rocker arm 192 has one end of a spring 198 connected thereto, the other end of the spring 198 being connected to and supported by the spring rod 118.

*Coil Holder Assembly*

Reference is now made to FIGURE 4A wherein a detail of the coil holder assembly is illustrated. As pointed out above, the coil holder 36 is pivotally mounted at one end thereof on a pair of stub shafts 38 in the bifurcated coil holder support block 34 to permit rocking of the coil holder 36 about the stub shafts 38 as a pivot point. It was also pointed out above that the parting knife 37 is also a part of the coil holder assembly. Details of the coil holder assembly will now be described. The coil holder 36 is the base member of this assembly and it is fabricated to receive and/or support the several detail components about to be described.

The coil holder 36 has a laterally extending bottom plate 36b which, in combination with a pair of side plates of substantially inverted L configuration attached thereto, define an enclosure for the several details of the coil holder assembly. The far side plate (as viewed in FIGURE 4A) is identified by the reference number 202. The near side plate (as viewed in FIGURES 4 and 4A) is identified by reference number 204. The side plate 204 is provided with a boss 204a for supporting an adjustable stop 206 which engages parting knife operating arm 64. The coil holder 36 is provided with a recessed chamber 36c therein, within which compression spring 208 is disposed. The forward end of spring 208 abuts the head of a coil clamp push pin 210. The shank of this pin 210 lies within a hole provided therefor in a coil clamp arm 212 which is slidably disposed on the coil holder 36 above the recessed chamber therein in which the compression spring 208 is disposed. The near side (as viewed in FIGURE 4A) of coil clamp arm 212 is provided with a laterally extending pin 214 which extends through an elongated slot provided therefor in parting knife 37 which is disposed alongside of coil clamp arm 212. The parting knife 37 is connected, at its rearward end, through a bifurcated link 216 and pin 218 to parting knife operating arm 64.

In substance, the foregoing coil holder assembly provides a positive drive for actuating the parting knife 37 into and out of position between turns of a coil supported on the coil holder 36, whereas the coil clamp arm 212 which cooperates with the upturned finger on the forward end of the coil holder 36 to grip a coil therebetween is spring driven. The parting knife 37 is reciprocated into and out of position between turns of a coil by the parting knife operating arm 64 to which it is connected by link 216. The coil clamp arm 212 is advanced into gripping engagement with a coil supported on the coil holder at the end thereof having an upturned finger by the compression spring 208 and its associated coil clamp push pin 210. For example, when the parting knife 37 is positively advanced, the elongated slot therein is displaced relative to the pin 214 projecting laterally from the side of coil clamp arm 216 and extending thereinto. As this relative displacement occurs, the loaded compression spring 208 advances the coil clamp arm 212 to which it is connected by coil clamp push pin 210. The forward travel of coil clamp arm 216 ends when it reaches gripping engagement of the coil. Further forward travel of the parting knife 37 is taken up by the elongated slot therein and this motion is not transmitted through the pin 214 to the coil clamp arm 212.

At the start of the return stroke of the parting knife 37, the knife alone will move rearwardly until the forward wall of the elongated slot therein engages the pin 214 projecting from coil clamp arm 212. Further rearward movement of the parting knife 37 then carries the coil clamp arm 212 with it and effects a compression of spring 208, thus providing the spring with a sufficient tension to accomplish the forward stroke of coil clamp arm 212 on the next operating cycle.

Operating Cycle

The operation of the apparatus of this invention will now be described, with reference being made to FIGURES 11–22. More particularly, as the operational description proceeds, particular reference will be made to the cam or cams in FIGURE 11 which initiate the action involved and the particular figure in FIGURES 12–16 on the one hand and FIGURES 17–22 on the other hand wherein the relative disposition of the work and the relative disposition of the immediate working tools respectively are illustrated.

At 0° in the operating cycle of the left hand coil forming assembly, the coil holder elevation cam 166, as shown in FIGURE 11 is in the rest position, thus locating the coil holder assembly in the coil loading position as viewed in FIGURE 17. At this point of time, the parting knife cam 146 (FIG. 11) is holding the parting knife in the "out" position and the bending knife vertical positioning cam 179 is holding the bending knife in the "down" position.

As soon as a coil 1 has been laid across the projecting upturned finger of the coil holder 36 as shown in FIGURE 17, the operating cycle is initiated. The first action to be transmitted to the devices which operate on the coil 1 is the advancement of the parting knife 37 by the parting knife cam 146 (FIGS. 11, 12, 4 and 4A). As the parting knife 37 advances toward its "in" position between adjacent turns of the coil 1, the compression spring 208 (FIG. 4A) is thereby released to drive the coil clamp arm 212 forward into gripping engagement with the coil 1. With the coil 1 so held, as shown in FIGURE 12, the forward stroke of the parting knife 37 continues until it has been located between adjacent turns of the coil 1 as shown in FIGURE 13. The forward stroke of the parting knife 37 is completed at about 25° (FIG. 11).

It will be noted in FIGURE 11 that at the same time that the parting knife cam 146 is advancing the parting knife 37 to its "in" position, the bending knife vertical positioning cam 179 is operating to advance the bending knife 70 from the solid to the phantom position as shown in FIGURE 5, i.e., from "down" to "up" as indicated in FIGURE 11. The "down" to "up" movement of the bending knife 70 occurs from 0° to about 60°.

Since, as noted above, the coil 1 has been clamped and the parting knife 37 has been inserted between adjacent turns of the coil at the end of about 25°, thus completing the initial positioning of these members at the coil loading position, the coil holder assembly is ready to be moved into the working plane illustrated by a broken line in FIGS. 17–22. This is effected between 50° and 60° (FIG. 11) by the coil holder elevation cam 166 through the mechanism illustrated in FIGURE 10 and described above. At about the time that the coil holder assembly has been elevated into the working plane (i.e., at about 60°), the bending knife vertical positioning cam 179 has completed the upward movement of the bending knife 70 and the bending knife inserting cam 136 (FIG. 11) takes over to move the bending knife 70 into position between turns of the coil adjacent to the turns between which the parting knife 37 has been inserted (FIGS. 13 and 18). The mechanism which accomplishes this is illustrated in FIGURE 6 and was described above. As shown in FIG. 13, a slight deflection of the coil 1 has been effected by the advancement of the bending knife 70 to its full "in" position.

The condition of the work and the relative location of the working tools at this point of time in the operating cycle, i.e., at about 72° in FIG. 11, is illustrated in FIGS. 13 and 18. The next operation performed on the coil is the stretching thereof between 72° and 85° by the coil stretching cam 196 (FIG. 11). The coil 1 is stretched as shown in FIGURE 14 by the bending knife 70 to which a sidewise movement has been imparted by the coil stretch cam 196 through the mechanism shown in FIGURES 7 and 7A and described above.

The bending knife rotating cam 126 (FIG. 11) now takes over, as soon as the aforesaid stretching has been completed, to effect a counter-clockwise rotation of the bending knife 70. From about 85° to about 112° of the operating cycle, the bending knife 70 is rotated about 90° to the position shown in FIGS. 15 and 19 by the mechanism shown in FIGURES 8 and 8A described above. It will be noted in FIGURE 11 that during this 90° rotation of the bending knife 70, occurring between about 85° to about 112° of the operating cycle, the coil stretching cam 196 is on the return in order to permit this rotation of the bending knife to be effected with the bending knife still between the turns of the coil as shown in FIGURE 15.

With the coil stretching cam 196 now back to its rest position at about 112° of the operating cycle (FIG. 11) after the bending knife 70 has rotated the coil about 90°, the bending knife rotating cam 126 continues to rotate the bending knife until about 142° of the operating cycle (FIG. 11), at which time the bending knife 70 has rotated through another 90° and moved the segment of the coil so deflected into the position shown in FIGURES 16 and 20. This completes the actual working operations on the coil by the coil forming mechanisms on the left side of the machine as viewed in FIGURE 2.

Although the coil forming mechanisms on the left side of the machine have completed their work on the coil during this particular operating cycle, the coil forming mechanisms on the right side of the machine must be moved into position to receive the coil and the coil forming mechanisms on the left side must be retracted. Most of the former takes place before the latter. It will be noted from an examination of the right side cam chart in FIGURE 11 that at 120° of the operating cycle, the coil holder elevation cam 166 is in the fully "up" position and the coil holder rocking cam 156 is in the fully counter-clockwise position, thus locating the right side coil holder assembly in the relative position shown in broken lines in FIGURES 18 and 19. Starting at 120° these two cams operate to displace the right side coil holder assembly, by their combined actions, to the coil receiving position thereof as shown in FIG. 20. Thus, while the left side coil former is completing its work at about 142° of the operating cycle, the right side coil former has started to move into position at about 120° of the operating cycle. At about 180° of the operating cycle, the right side coil holder assembly has moved into coil receiving position as shown in FIGURE 20.

Starting at 180° of the operating cycle (FIG. 11), it will be noted that the right side parting knife cam 146 begins to advance its parting knife and the compression spring of the right side coil holder advances its coil clamp arm just as the left side mechanisms did starting at 0° as described above. Similarly, the right side bending knife vertical positioning cam 179 starts to move its associated bending knife upwardly. As the bending knife nears its fully "up" position, the coil holder elevation cam 166 (FIG. 11) raises the coil holder assembly from the coil receiving position to the working plane. Thus, at about 240° of the operating cycle, the right side coil former has assumed the position thereof shown in FIG. 21, i.e., the coil has been secured in the coil holder, the parting knife has been inserted, the bending knife has been elevated and the coil holder assembly has been elevated to the working plane. From this point on, the coil forming operations performed on the coil by the right side coil former mechanisms are the same as those just described with respect to the corresponding operations performed by the left side coil former mechanisms and thus they will not be repeated in detail here.

It will also be noted at this point, as reflected in FIG. 11, that the parting knife, the coil clamp arm and the bending knife of the left side coil former have all been retracted from engagement with the coil, and the coil holder rocking cam 156 has rocked the coil holder assembly clockwise a distance sufficient to drop it slightly below the working plane as shown in FIG. 21. As will be noted in FIG. 11, clockwise rotation of the left side coil holder assembly by the coil holder rocking cam 156 begins at about 215° of the operating cycle and ends at about 270°. During this time period, i.e., from about 240° to about 265°, the coil holder elevation cam 166 elevates the coil holder assembly to the fully "up" position. Thus the left side coil holder assembly, under the combined influence of rocking cam 156 and elevation cam 166, is moved through the curved path identified by the curved arrow in FIG. 22 to displace it sufficiently from the right side coil holder assembly to permit the latter to operate freely on the work with no interference from the former.

The right side coil former, as will be noted from an examination of the right side cam chart in FIGURE 11, completes its operations on the coil at about 320° of the operating cycle. It will also be noted from an examination of the left side cam chart in FIGURE 11 that starting at about 300° the left side coil holder rocking cam 159 starts to impart a counter-clockwise rotation to its coil holder assembly and the coil holder elevation cam 166 starts to impart a downward movement thereto. These combined motions imparted to the left side coil holder assembly effect a displacement thereof from its position as shown in phantom in FIGURE 22 to the position thereof shown in solid in FIGURE 17, bearing in mind that the last phase of the operation of the coil holder elevation cam 166 (from 350° to 360°) is a slight upward movement to finally effect location of the coil holder assembly in the coil receiving position for the next operating cycle.

Some liberties have been taken in FIG. 22 insofar as the illustration of the coil 1 is concerned. In this figure, the coil is shown as it appears after several operating cycles of both the left hand and right hand coil former mechanisms have been completed, i.e., after a plurality of coil segments have been formed by both the right hand and left hand coil former mechanisms.

Drive Control

In the foregoing description, particularly the description of FIG. 3, the sequence of operations of the several cams on the left side drive shaft 110 and the right side drive shaft 110 were described. The means for driving these two cam shafts 110 and the control mechanism associated therewith will now be described. Referring now to FIGS. 23 and 24, each of the drive shafts 110 is connected by helical gears 222 and 224 to drive shaft 226. The drive shaft 226 is supported beneath the table or main base member 24 by a pair of bearing hangers 228 and pillow block 230. A clutch 238, having a pulley 232 fixedly attached thereto, is disposed on shaft 226. The pulley 232 is connected to motor 234 by V-belt 236, thus providing a means for driving the drive shaft 226. A solenoid 240, disposed on the top of table 24, controls the engagement and disengagement of clutch 238 with the shaft 226 on which it is disposed. The solenoid 240 is connected by link 242 to lever 244. The lever 244 extends through an aperture 246 in the table 24 and is pivotally mounted intermediate its ends in bracket 248 attached to the underside of table 24. The lever 244 is provided with a clutch stop 250 which, in the operation of the solenoid 240, provides for engagement and disengagement of the clutch 238. Tension is maintained on the lever 244 by a compression spring 252, one end of which is connected to the lever 244, the other end thereof being supported by a spring stud 254 depending from the table 24.

The mechanism for controlling the energization of the solenoid 240, engagement and disengagement of the clutch 238 and driving of the two shafts 110 will now be described. A spur gear 256 on drive shaft 226 is connected through a gear train 258 to control shaft 260. The gear train 258 and the control shaft 260 are supported in a bracket 262 attached to and depending from table 24. A pair of cams 264 and 266 are mounted on the control shaft 260. The cams 264 and 266 are provided with lobes 265 and 267 respectively. The lobes 265 and 267 move into and out of engagement with electrical contacts 268 and 270 of switches 272 and 274 respectively. The switches 272 and 274 are attached to spacer 276 which is in turn attached to a side face of bracket 262.

The shaft 226 is provided at one end thereof with a spur gear 280 to which a manually operated wheel not shown may be connected. An arrangement of this type is helpful when it is desired to have some means for actuating the filament forming apparatus through a small portion of its operating cycle to check timing, adjustments, etc.

The manner in which a complete operating cycle of the filament forming apparatus is effected to form from a filament coil a lamp filament having a plurality of segments connected by loops will now be described. An operator positions a filament coil in the coil holder of the filament former which is located in the coil-receiving position. The operator holds the filament coil in the coil holder until it is gripped as described in detail above. Actuation of the filament forming apparatus is initiated by the operator who, when the filament coil has been positioned as just described, closes an electrical switch (not shown) to energize the solenoid 240 and thus effect engagement of the clutch 238 with the drive shaft 226 on which it is disposed provides for the transmission of rotational movement to the shaft 226 from the motor 224 through the V-belt 236 and the pulley 232. Rotational movement of the shaft 226 is transmitted through helical gears 224 disposed thereon through helical gears 222 to the two drive shafts 110.

Since it is desired to shape the filament coil into a lamp filament having a predetermined number of segments and connected loops, rotation of the two drive shafts 110 must be terminated when the desired number of segments and loops have been formed. This is accomplished by cam 264 on control shaft 260. As noted above, the drive shaft 226 is connected through spur gear 256 and gear train 258 to control shaft 260 on which the control cam 264 is mounted. The gear train 258 is designed to effect one revolution of control shaft 260 for each filament coil forming operation. Thus when the several segments and loops have been formed the lobe 265 on the control cam 264 engages the electrical contacts 268 of switch 272. The switch 272 is electrically connected (by means not shown) to solenoid 240. The switch 272 serves as a control for the solenoid 240. Thus the control cam 264 through the switch 272 actuates the solenoid 240 to effect disengagement of the clutch 238 to terminate rotation of shaft 226 and the pair of shafts 110.

With the filament coil now formed into a lamp filament having a plurality of segments connected by loops and the actuation of the filament forming devices having been arrested, the lamp filament is removed. The lamp filament may be dislodged from the coil holder which supports it at the end of the operating cycle either manually or by a suitable automatic means. One automatic means which has been found to be satisfactory is the use of a blast of air under pressure to effect dislodging of the finished lamp filament from its coil holder. Control of this air blast is effected by cam 266 on control shaft 260 and the electrical switch 274 associated therewith. This cam 266, like cam 264, moves through one revolution for each operating cycle of the filament forming apparatus. Thus, when the filament forming operations have been completed, the lobe 267 on cam 266 engages the electrical contacts 270 of switch 274. The switch 274 is connected by suitable means to a control valve to permit an air blast to be directed at the finished lamp filament to dislodge it from the coil holder in which it has been disposed. The foregoing air blast arrangement for dislodging the finished filament has not been illustrated in the accompanying drawings since it is not an integral part of this invention and its illustration in the appropriate figures of the drawings would tend more to confuse than to clarify the illustration of the filament forming apparatus.

It will be readily appreciated by those skilled in the art that different gear trains 258 may be employed to obtain any desired gear ratio depending upon the number of segments and the number of loops which it is desired to form in any given lamp filament. Thus the gear train 258 is designed in each instance to provide that gear ratio between shafts 226 and 260 which will provide the desired number of coil segments and connected loops during one revolution of the control shaft 260 and the control cam 264.

The forming of a particular type of biplane lamp filament is illustrated in the accompanying drawings and described above in connection with a specific embodiment of the invention. It will be readily appreciated by those skilled in the art that other types of filaments may be formed with the basic components of the apparatus of this invention. For example, if in any given application it is found that stretching of the filament coil to effect elongation of a turn thereof to define an elongated loop is not necessary, the coil stretching cam 196 and its associated mechanisms may be omitted. Similarly, if it is found that separate loops, distinct from coil segments, are not necessary and suitable supporting wires may be threaded through portions of the segments, loop forming may be omitted. In this instance, the bending knife 70 would be inserted alongside of the parting knife 37 with no turns of the filament coil disposed therebetween. Although, in the specific embodiment of the invention, the filament coil is swung through about 180 degrees during the formation of each coil segment, if multisegment filaments other than the parallel biplane type is desired, the degree of rotation of the bending knife 70 may be adjusted accordingly.

What I claim is:

1. In apparatus for shaping a length of filament coil into a lamp filament having a plurality of segments connected by loops, the combination of: a coil holder, a parting knife and a bending knife, said coil holder and said parting knife being disposed adjacent to and substantially parallel to one another along their respective longitudinal axes, and said bending knife being disposed beneath and substantially perpendicular to said longitudinal axes of said coil holder and said parting knife; means for gripping in said coil holder said length of filament coil near one end thereof; means for advancing said parting knife to a position between adjacent turns of the filament coil in said coil holder; means for advancing said bending knife into a position between turns of said filament coil adjacent to said parting knife whereby a single turn of said filament coil is disposed between said knives; means for reciprocating said bending knife laterally with respect to said parting knife while so disposed whereby the said single turn of said filament coil is stretched to define an elongated loop during the forward movement of said reciprocating stroke of said bending knife; and means for rotating said bending knife about its own longitudinal axis and through about 180 degrees whereby the free portion of the filament coil is displaced to a position substantially parallel to the portion gripped by said coil holder, the return movement of said reciprocating stroke of said bending knife being effected during about the first 90 degrees of rotation of said bending knife about its own longitudinal axis.

2. In apparatus for shaping a length of filament coil into a lamp filament having a plurality of segments connected by loops, the combination of: a coil holder, a parting knife and a bending knife, said coil holder and said parting knife being disposed adjacent to and substantially parallel to one another along their respective longitudinal axes, and said bending knife being disposed beneath and substantially perpendicular to said longitudinal axes of said coil holder and said parting knife; means for gripping in said coil holder said length of filament coil near one end thereof; means for advancing said parting knife to a position between adjacent turns of the filament coil in said coil holder; means for elevating said bending knife into substantially the same plane as the plane in which the longitudinal axis of said coil holder and said parting knife is disposed; means for advancing said bending knife while so disposed into a position between turns of said filament coil adjacent to said parting knife whereby a single turn of said filament coil is disposed between said knives; means for displacing said bending knife laterally with respect to said parting knife and away from said parting knife whereby the said single turn of the filament coil disposed therebetween is stretched to define an elongated loop; and means for rotating said bending knife about its own longitudinal axis and through about 180 degrees whereby the free portion of the filament coil is displaced to a position substantially parallel to the portion gripped by said coil holder, thereby defining a first segment and a first loop.

3. In apparatus for shaping a length of filament coil into a lamp filament having a plurality of segments connected by loops, the combination of: a coil holder, a parting knife and a bending knife, said coil holder and said parting knife being disposed adjacent to and substantially parallel to one another along their respective longitudinal axes, and said bending knife being disposed beneath and substantially perpendicular to said longitudinal axes of said coil holder and said parting knife; means for gripping in said coil holder said length of filament coil near one end thereof; means for advancing said parting knife to a position between adjacent turns of the filament coil in said coil holder; means for elevating said bending knife into substantially the same plane as the plane in which the longitudinal axis of said coil holder and said parting knife is disposed; means for advancing said bending knife while so disposed into a position between turns of said filament coil adjacent to said parting knife whereby a single turn of said filament coil is disposed between said knives; means for reciprocating said bending knife laterally with respect to said parting knife while so disposed whereby the said single turn of said filament coil is stretched to define an elongated loop during the forward movement of said reciprocating stroke of said bending knife; and means for rotating said bending knife about its own longitudinal axis and through about 180 degrees whereby the free portion of the filament coil is displaced to a position substantially parallel to the portion gripped by said coil holder, the return movement of said reciprocating stroke of said bending knife being effected during about the first 90 degrees of rotation of said bending knife about its own longitudinal axis.

4. In apparatus for shaping a length of filament coil into a lamp filament having a plurality of segments connected by loops, the combination of: a first coil former and a second coil former, each of said coil formers including a coil holder, said coil holders being disposed adjacent to and in cooperative relationship with respect to one another; means for locating said first coil holder in a coil-receiving plane; means for locating said second coil holder in a coil-working plane when said first coil holder is disposed in said coil-receiving plane, said coil-working plane being above, in register with and substantially parallel to said coil-receiving plane; means for advancing said first coil holder from said coil-receiving plane to said coil-working plane; means for moving said second coil holder through a curved path, first downwardly and then upwardly to displace it from the said coil-working plane to a rest position above said coil-working plane; and means for subsequently moving said second coil holder from said rest position through a curved path, first downwardly through said coil-working plane and said coil-receiving plane and then upwardly into said coil-receiving plane.

5. The combination of claim 4 and means for sequentially cycling the said first coil holder and the said second coil holder as aforesaid through a predetermined number of operating cycles.

6. In apparatus for shaping a length of filament coil into a lamp filament having a plurality of segments connected by loops, the combination of: a first coil former and a second coil former, each of said coil formers including a coil holder, said coil holders being disposed adjacent to and in cooperative relationship with respect to one another; means for locating said first coil holder in a coil-receiving plane; means for locating said second coil holder in a coil-working plane when said first coil holder is disposed in said coil-receiving plane, said coil-working plane being above, in register with and substantially parallel to said coil-receiving plane; means for advancing said first coil holder from said coil-receiving plane to said coil-working plane; means for moving said second coil holder to a rest position out of said coil-working plane; and means for subsequently moving said second coil holder from said rest position into said coil-receiving plane.

7. The combination of claim 6 and means for sequentially cycling the said first coil holder and the said second coil holder as aforesaid through a predetermined number of operating cycles.

8. In apparatus for shaping a length of filament coil into a lamp filament having a plurality of segments connected by loops, the combination of: a first coil former and a second coil former, each of said coil formers including a coil holder, said coil holders being disposed adjacent to and in cooperative relationship with respect to one another; means for locating said first coil holder in a coil-receiving plane to receive the work; means for locating said second coil holder in a coil-working plane when said first coil holder is disposed in said coil-receiving plane, said coil-working plane being above, in register with and substantially parallel to said coil-receiving plane; means for advancing said first coil holder from said coil-receiving plane to said coil-working plane for operation on the work disposed on said coil holder; means for moving said second coil holder through a curved path, first downwardly and then upwardly to displace it from the said coil-working plane to a rest position above said coil-working plane when operations on the work disposed on said first coil holder are initiated; and means for subsequently moving said second coil holder from said rest position through a curved path, first downwardly through said coil-working plane and said coil-receiving plane and then upwardly into said coil-receiving plane when operations on the work disposed on said first coil holder approach completion, whereby the coil holder of said second coil former is located in coil-receiving position with respect to the work when operations on the work disposed on said first coil holder have been completed.

9. The combination of claim 8 and means for sequentially cycling the said first coil holder and the said second coil holder as aforesaid through a predetermined number of operating cycles.

10. Apparatus for shaping a length of filament coil into a lamp filament having a plurality of segments, said apparatus comprising: a first coil former and a second coil former, each of said coil formers including a coil holder, a parting knife and a bending knife, said coil holder and said parting knife being disposed adjacent to and substantially parallel to one another along their respective longitudinal axes, and said bending knife being disposed beneath and substantially perpendicular to said longitudinal axes of said coil holder and said parting knife; means for gripping in said first coil holder said length of filament coil near one end thereof; means for advancing said first parting knife to a position between adjacent turns of the filament coil in said first coil holder; means for advancing said bending knife into a position between said adjacent turns of said filament coil and adjacent to said parting knife; means for rotating said bending knife about its own longitudinal axis while said parting knife is disposed between said adjacent turns, thereby deflecting the free portion of said filament coil and defining a coil segment comprising the non-deflected portion thereof; means for advancing the coil holder of said second coil former into receiving position with respect to the free portion of said filament coil; means for gripping in said second coil holder said free portion of said filament coil; means for advancing the parting knife of said second coil former to a position between adjacent turns of the filament coil in said second coil holder; means for advancing the bending knife of said second coil former into a position between said adjacent turns of said filament coil and adjacent to said parting knife; means for rotating said second bending knife about its own longitudinal axis while said second parting knife is disposed between said adjacent turns, thereby deflecting the remaining free portion of said filament coil and defining a second coil segment comprising the non-deflected portion thereof; and means for sequentially initiating actuation of the said first coil former and the said second coil former alternately on the remaining free portion of said filament coil whereby the forming of a biplane lamp filament having a plurality of segments is effected.

11. Apparatus for shaping a length of filament coil into a lamp filament having a plurality of segments connected by loops, said apparatus comprising: a first coil former and a second coil former, each of said coil formers including a coil holder, a parting knife and a bending knife, said coil holder and said parting knife being disposed adjacent to and substantially parallel to one another along their respective longitudinal axes, and said bending knife being disposed beneath and substantially perpendicular to said longitudinal axes of said coil holder and said parting knife; means for gripping in said first coil holder said length of filament coil near one end thereof; means for advancing said first parting knife to a position between adjacent turns of the filament coil in said first coil holder; means for advancing said bending knife into a position between turns of said filament coil adjacent to said parting knife whereby a single turn of said filament coil is disposed between said knives; means for rotating said bending knife about its own longitudinal axis while said parting knife is so disposed, thereby deflecting the free portion of said filament coil and defining a coil segment comprising the non-deflected portion thereof and a connecting loop defined by said single turn; means for advancing the coil holder of said second coil former into receiving position with respect to the free portion of said filament coil; means for gripping in said second coil holder said free portion of said filament coil near said first loop; means for advancing the parting knife of said second coil former to a position between adjacent turns of the filament coil in said second coil holder; means for advancing the bending knife of said second coil former into a position between turns of said filament coil adjacent to said parting knife whereby a single turn of said filament coil is disposed between said knives of said second coil former; means for rotating said second bending knife about its own longitudinal axis while said parting knife is so disposed, thereby deflecting the remaining free portion of said filament coil and defining a second coil segment comprising the non-deflected portion thereof and a connecting loop defined by said single turn; and means for sequentially initiating actuation of the said first coil former and the said second coil former alternately on the remaining free portion of said filament coil whereby the forming of a lamp filament having a plurality of segments connected by loops is effected.

12. Apparatus for shaping a length of filament coil into a biplane lamp filament having a plurality of segments connected by loops, said apparatus comprising: a first coil former and a second coil former, each of said coil formers including a coil holder, a parting knife and a bending knife, said coil holder and said parting knife being disposed adjacent to and substantially parallel to one another along their respective longitudinal axes, and said bending knife being disposed beneath and substantially perpendicular to said longitudinal axes of said coil header and said parting knife; means for gripping in said first coil holder said length of filament coil near one end thereof; means for advancing said first parting knife to a position between adjacent turns of the filament coil in said first coil holder; means for advancing said bending knife into a position between turns of said filament coil adjacent to said parting knife whereby a single turn of said filament coil is disposed between said knives; means for reciprocating said bending knife laterally with respect to said parting knife while so disposed whereby the said single turn of said filament coil is stretched to define an elongated loop during the forward movement of said reciprocating stroke of said bending knife; means for rotating said bending knife about its own longitudinal axis and through about 180 degrees whereby the free portion of the filament coil is displaced to a position substantially parallel to the portion gripped by said coil holder, the return movement of said reciprocating stroke of said bending knife being effected during about the first 90 degrees of rotation of said bending knife about its own longitudinal axis, thereby defining a first segment and a first loop; means for advancing the coil holder of said second coil former into receiving position with respect to the free portion of said filament coil; means for gripping in said second coil holder, said free portion of said filament coil near said first loop; means for advancing the parting knife of said second coil former to a position between adjacent turns of the filament coil in said second coil holder; means for advancing the bending knife of said second coil former into a position between turns of said filament coil adjacent to said parting knife whereby a single turn of said filament coil is disposed between said knives of said second coil former; means for reciprocating said bending knife laterally with respect to said parting knife while so disposed whereby the said single turn of said filament coil is stretched to define an elongated loop during the forward movement of said reciprocating stroke of said bending knife; means for rotating said second bending knife about its own longitudinal axis and through about 180 degrees whereby the remaining free portion of the filament coil is displaced to a position substantially parallel to the portion gripped by said second coil holder, the return movement of said reciprocating stroke of said second bending knife being effected during about the first 90 degrees of rotation of said second bending knife about its own longitudinal axis, thereby defining a second segment and a second loop; and means for sequentially initiating actuation of the said first coil former and the said second coil former alternately on the remaining free portion of said filament coil whereby the forming of a biplane lamp filament having a plurality of segments connected by loops is effected.

13. Apparatus for shaping a length of filament coil into a biplane lamp filament having a plurality of segments connected by loops, said apparatus comprising: a first coil former and a second coil former, each of said coil formers including a coil holder, a parting knife and a bending knife, said coil holder and said parting knife being disposed adjacent to and substantially parallel to one another along their respective longitudinal axes, and said bending knife being disposed beneath and substantially perpendicular to said longitudinal axes of said coil holder and said parting knife; means for gripping in said first coil holder said length of filament coil near one end thereof; means for advancing said first parting knife to a position between adjacent turns of the filament coil in said first coil holder; means for elevating said bending knife into substantially the same plane as the plane in which the longitudinal axis of said first coil holder and said first parting knife is disposed; means for advancing said bending knife while so disposed into a position between turns of said filament coil adjacent to said parting knife whereby a single turn of said filament coil is disposed between said knives; means for displacing said bending knife laterally with respect to said parting knife and away from said parting knife whereby the said single turn of the filament coil disposed therebetween is stretched to define an elongated loop; means for rotating said bending knife about its own longitudinal axis and through about 180 degrees whereby the free portion of the filament coil is displaced to a position substantially parallel to the portion gripped by said coil holder, thereby defining a first segment and a first loop; means for advancing the coil holder of said second coil former into receiving position with respect to the free portion of said filament coil; means for gripping in said second coil holder said free portion of said filament coil near said first loop; means for advancing the parting knife of said second coil former to a position between adjacent turns of the filament coil in said second coil holder; means for elevating said bending knife into substantially the same plane as the plane in which the longitudinal axis of said second coil holder and said second parting knife is disposed; means for advancing the bending knife of said second coil former while so disposed into a positoin between turns of said filament coil adjacent to said parting knife whereby a single turn of said filament coil is disposed between said knives of said second coil former; means for displacing said second bending knife laterally with respect to said parting knife and away from said second parting knife whereby the said single turn of the filament coil disposed therebetween is stretched to define a second elongated loop; means for rotating said second bending knife about its own longitudinal axis and through about 180 degrees whereby the remaining free portion of the filament coil is displaced to a position substantially parallel to the portion gripped by said second coil holder, thereby defining a second segment and a second loop; and means for sequentially initiating actuation of the said first coil former and the said second coil former alternately on the remaining free portion of said filament coil whereby the forming of a biplane lamp filament having a plurality of segments connected by loops is effected.

References Cited by the Examiner
UNITED STATES PATENTS

| | | | |
|---|---|---|---|
| 2,449,653 | 9/48 | Isaac et al. | 140—71.5 |
| 2,759,498 | 8/56 | Mann et al. | 140—71.5 |
| 2,840,118 | 6/58 | Gail | 140—92.8 |
| 2,991,812 | 7/61 | Wolf | 140—71.5 |
| 3,021,874 | 2/62 | Lyon et al. | 140—92.2 |

CHARLES W. LANHAM, *Primary Examiner.*

RICHARD A. WAHL, WILLIAM F. PURDY,
*Examiners.*